Nov. 1, 1966  R. M. BAKER  3,282,100
FINE WIRE CALORIMETER
Filed April 10, 1963  2 Sheets-Sheet 1

WITNESSES
Theodore F. Wrobel
William L. Gates

INVENTOR
Robert M. Baker
BY
Ernest P. Klipfel
ATTORNEY

United States Patent Office 3,282,100
Patented Nov. 1, 1966

3,282,100
FINE WIRE CALORIMETER
Robert M. Baker, Catonsville, Md., assignor to Westinghouse Electric Corporation, Pittsburgh, Pa., a corporation of Pennsylvania
Filed Apr. 10, 1963, Ser. No. 272,111
9 Claims. (Cl. 73—190)

This invention relates to calorimetric devices in general and, in particular, to a fine wire calorimeter for measuring the power output of optical energy sources such as the light maser (laser) and other similar devices.

With the advent of the laser, the problem exists in determining its characteristics and measuring its properties including the energy output of the device. One such apparatus is the calorimeter which measures energy in the form of heat produced by the change of optical energy into heat energy. Conventional calorimeters absorb the energy in a small quantity of liquid or in a small piece of solid material and use a thermocouple to measure the resulting temperature rise. Knowing the heat capacity of the absorbing material, the temperature rise is a measure of the energy absorbed. There exist, of course, the usual problems of absorbing as large a fraction of the incident energy as possible and knowing the fraction of total energy absorbed. These problems can be overcome by ingenuity of measurement, but one basic problem remains; namely, it is necessary to obtain temperature equalization before the temperature rise is measured. This requires stirring in the case of a liquid and in the case of a solid it means waiting for the equalization by thermal conduction. In either case, a certain amount of heat is lost before equilibrium is reached and this introduces an error in the determination of the energy absorbed.

It is an object of the present invention to provide an improved calorimetric device for the measurement of the energy output from an optical source providing a highly collimated parallel beam of coherent light energy in the visible or near visible region of the electromagnetic spectrum.

It is another object of the present invention to provide a calorimetric device allowing immediate measurement of the energy directed thereto.

It is a further object of the present invention to provide a unique kind of calorimeter especially suited to measuring the output energy of light masers (lasers).

It is still another object of the present invention to provide a calorimetric device which measures the output energy of a laser in terms of the change in resistance of an absorption unit wherein the resistance change occurring upon the absorption of energy is independent of the distribution of the output energy.

It is another object of the present invention to provide a device capable of measuring the power output from both a pulsed laser and a continuous source such as a continuous wave (CW) laser wherein the measuring device indicates the energy absorbed in a selected short interval of time.

The basic concept of the present invention is to provide a calorimetric device wherein the laser beam energy is trapped and absorbed in a bolometer unit comprising a concentration bundle of fine insulated copper wire randomly packed in an insulated container. The change in resistance of this unit is proportional to the energy absorbed and is practically independent of the distribution of energy within the unit. The bolometer unit is placed in a conventional Wheatstone bridge circuit and beam energy is measured in terms of galvanometer deflection. The necessity for stirring or waiting for temperature equalization is obviated. The bundle of wire acts both as a scatterer and an absorber of the incident energy and by suitable geometrical arrangement and packing the percentage of total energy absorbed in the wire can be controlled and the loss to the outside can be made substantially negligible.

Other advantages and objects of the present invention will become apparent after a study of the following specification read in connection with the accompanying drawings, in which.

Figure 1:
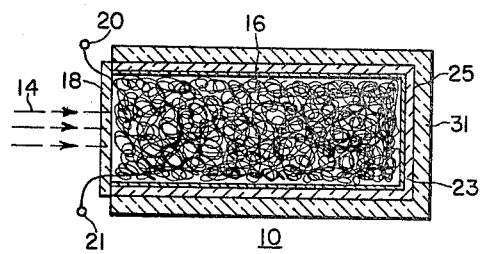
FIGURE 1 is an illustrative diagram of a bolometer unit utilized in the subject invention.

Attention is now drawn to FIGURE 1 which illustrates an embodiment of a bolometer unit in accordance with the subject invention. Broadly, the bolometer unit 10 may be described as a bundle of fine, enameled copper wire located inside of a container and having an opening to the inside for allowing light energy from a source such as a laser beam to enter the opening and be absorbed in the bundle causing the wire to be heated with a corresponding change in the resistance of the wire. The ends of the fine wire are brought out to flexible leads and a flat glass window is placed over the open end of the container to minimize the distributing effects of air currents.

More particularly with reference to FIGURE 1, the bolometer unit 10 comprises a cylindrical container 25 made of a material such as glass and having a highly silvered coating 23 on substantially the entire inner surface. A layer of thermal insulating material 31 is placed around the glass container 25 to reduce the effects of ambient temperature variations. Inside of the container 25 is located a randomly packed, predetermined length of fine electrical wire 16 having an insulating coating. The length of fine wire 16 has terminals 20 and 21 at either end and is brought to the outside of the container 25. An opening with a window 18 is provided such that light energy from an optical source in the form of a light beam 14 enters through the window 18 and penetrates the bundle of fine wire 16. The light energy from the beam 14 is absorbed in the bundle of fine wire 16 which is heated thereby. Those rays from the beam 14 which are not absorbed by the bundle 16 on the initial passage through the length of the container 25 bounce off of the highly reflective surface 23 to be absorbed on the return path back towards the window 18. In this manner substantially all of the light energy entering through the window 18 is absorbed in the wire bundle 16.

As an example of the property of the bundle of fine insulated electrical wire 16, it may consist typically of approximately 1000 feet (980 ohms) of No. 40 B & S gauge enameled copper wire.

In order to illustrate how the bolometer unit comprising a predetermined length of fine enameled copper wire may be used to measure the energy impinging on it in the form of a light beam, the calorimetric equation subsequently following must be considered. If, for example, the energy from an optical source such as a laser is to be measured, the following considerations should be noted. Typically, the pulse length of the ruby laser is $5 \times 10^{-4}$ second with a total energy of 10 joules more or less depending upon operating conditions. When a pulse is fired into the bolometer unit 10 such as illustrated in FIGURE 1, the beam is successively scattered and absorbed by the individual turns within the bundle of wire 16 until the total energy is substantially absorbed and appears as a temperature rise in the wire. If a particular short section of wire has a resistance $R_0'$ before the pulse is directed into the bolometer, its resistance $R_2$ after the pulse will be $$R' = R_0' (1 + \alpha \Delta t) \text{ ohms} \tag{1}$$

where $\alpha$ is the temperature coefficient of resistance, and $\Delta t$ is the temperature rise. The change in resistance, therefore, is $$\Delta R' = R_0' \alpha \Delta t \text{ ohms} \tag{2}$$

If this short section of wire absorbs an energy $E'$ joules, and has a mass $M'$ grams and a specific heat $c$, it will experience a temperature rise $\Delta t$ according to the equation $$\Delta t = \frac{E'}{4.19 M' c} \text{ degrees centigrade} \tag{3}$$

Combining Equations 2 and 3 the change in resistance for a particular section of wire can be stated as, $$\Delta R' = \frac{R_0' E' \alpha}{4.19 M' c} \text{ ohms} \tag{4}$$

The total resistance change of the bolometer unit is simply the summation of $\Delta R'$ over the total length of the wire making up the bundle enclosed in the container. If the wire is of uniform cross-section, $$\frac{R_0'}{M'} = \frac{R_0}{M}$$

the ration of corresponding quantities for the total length of the wire. If it is further assumed that $\alpha$ and $c$ are constant, i.e., independent of temperature, it follows that the total change in resistance of the bolometer is, $$\Delta R = \frac{\alpha R_0}{4.19 M c} \Sigma E'$$

$$= \frac{\alpha R_0 E}{4.19 M c} \text{ ohms} \tag{5}$$

where $E$ is the total energy absorbed. This shows that the change in resistance $\Delta R$ is directly proportional to the total energy absorbed and is independent of how the energy is distributed in the wire mass provided that (1) the wire is of uniform cross section, and (2) the temperature coefficient of resistance $\alpha$ and specific heat $c$ of the wire are independent of temperature. These are reasonable assumptions if the temperature rise of the wire is not excessive.

To utilize the bolometer unit to measure energy, the Equation 5 is inverted to read, $$E = \frac{4.19 M c}{\alpha R_0} \cdot \Delta R \text{ joules} \tag{6}$$

Substituting the values of $M/R_0$, $c$, and $\alpha$ for No. 40 B & S copper wire which was used as an example, Equation 6 becomes, $$E = 1.40 \Delta R \text{ joules} \tag{7}$$

This is the basic calorimetric equation but a number of correction factors must be made. The thickness of the varnish insulation, the reflection of incident light by the window itself and the back scattering from the wire must be taken into account. The aforementioned No. 40 copper wire used as a typical example, has a layer of varnish insulation .0003" thick, having a specific heat of 0.40, and a density of 1.40 grams per cubic centimeter. This layer of insulation increases the thermal capacity of each element of wire length by 29%. The window reflects 8% of the normal incident beam energy and the measured back-scattering from the wire mass is found to be approximately 18%. Applying these corrections, the basic calorimetric equation becomes, $$E = 2.38 \Delta R \text{ joules} \tag{8}$$

It is to be pointed out at this time that the foregoing analysis is made by way of example only and is not meant to be considered in a limiting sense. Those skilled in the art may readily wish to employ a different size and a different length wire providing a corresponding different proportionality factor for the measurement of energy. What is significant, however, is the fact that a predetermined length of selected insulated wire having a known resistance can be utilized to absorb light energy providing a measure of the light energy in terms of its change in resistance since it has been shown that the change in resistance is directly proportional to the energy absorbed and is independent of how the energy is distributed in the wire mass.

In measuring the energy output or power output from a laser, for example, the beam is directed to the bolometer unit 10 such that substantially all or a predetermined portion thereof, which would be the case when beam sampling is used, is directed to the bolometer. The change in resistance due to the absorption of the optical energy by the randomly packed bundle of wire is measured in a Wheatstone bridge circuit, and the energy calculated accordingly.

It has been found, however, that the subject invention operates in an optimum manner when the bolometer unit 10 previously described is used in combination with an average-temperature compensating element comprising a resistance which changes with temperature like the wire in the bolometer unit. The purpose of the average-temperature compensating element is to minimize drift in the measuring bridge from changes in ambient temperature. One type of compensating element is another bolometer unit, similar to one described, used as a dummy unit in one resistance arm of the Wheatstone bridge.

Figure 2:
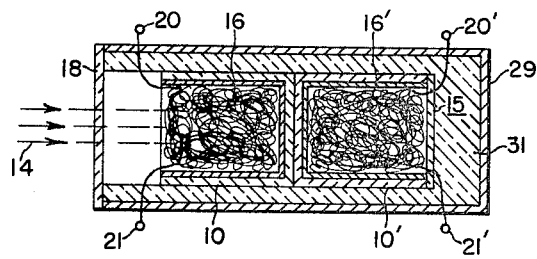
FIGURE 2 is an illustrative diagram of a bolometer assembly helpful in explaining the subject invention.

A first bolometer assembly 19a comprising two bolometer units is illustrated in FIGURE 2. Shown therein is an active bolometer unit 10 and a dummy bolometer unit 10' in reasonably good thermal contact with bolometer unit 10 located within a housing 29 having thermal insulation 31. Bolometer units 10 and 10' are arranged in such a manner that the active bolometer unit 10 is adapted to receive optical energy from the beam 14 while the dummy bolometer unit 10' is arranged such that none of the incident energy is allowed to strike it. As illustrated, the bolometer units 10 and 10' are arranged in a back-to-back thermal contact configuration. Additionally, the bolometer assembly 19a includes a window 18 in the housing 19 such that the optical energy from the laser beam 14 can pass into the assembly and impinge on the active bolometer unit 10.

Figure 3:
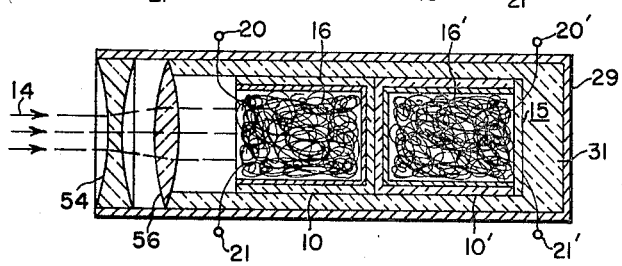
FIGURE 3 is an illustrative diagram of another bolometer assembly helpful in explaining the subject invention.

Another embodiment of a bolometer assembly utilizing two similar bolometer units is illustrated in FIGURE 3. This embodiment 19b is similar to that illustrated in FIGURE 2 except that the assembly includes optical means comprising a first lens 54 and a second lens 56 whereby the first lens 54 acts to diverge the incident beam 14 while the second lens 56 acts to direct the thus diverged beam to the active bolometer unit 10 such that the light energy illuminates an enlarged area of the bundle of wire 16.

Figure 4:
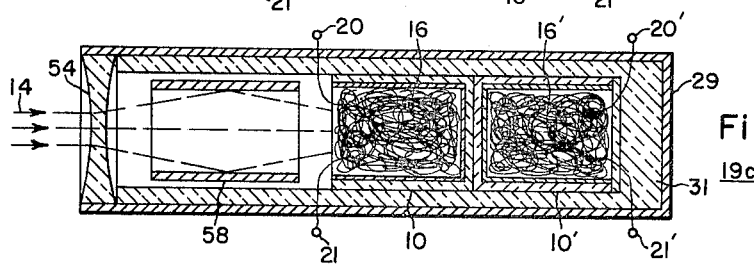
FIGURE 4 is an illustrative diagram of still another bolometer assembly helpful in explaining the subject invention.

A third embodiment 19c of a bolometer assembly utilizing an active and a dummy bolometer unit is shown in FIGURE 4. This embodiment is similar to that illustrated in FIGURE 3 except that the second optical lens has been replaced by a light pipe 58. In this embodiment, the incident beam 14 is diverged by the lens 54 and enters the light pipe 58 which directs the light energy to the random type bundle of wire 16 or bolometer unit 10. The light pipe 58 may be any selected cylindrical reflector. Furthermore, this embodiment is an improvement over the embodiment of FIGURE 3 in that the requirement for aligning the assembly such that the beam enters the bolometer unit 10 is made less critical. If the optic assembly is not quite properly aligned, part of the beam will strike the walls of the cylindrical reflector, but will still be directed into the wire mass of the active bolometer 10.

It should be noted, however, that the bolometer units illustrated in FIGURES 2, 3 and 4 are shown by way of illustration only and it is to be understood that various combinations of optical elements can be made.

These assemblies may even be removable. Also, it is within the scope of the present invention that the dummy bolometer unit 10′, acting as the average-temperature compensating element may be replaced by a predetermined length of enameled electrical wire similar to the wire 16 of FIGURE 1 but instead of being in a separate container, it is merely wrapped around the outside of the container 25.

Figure 5:
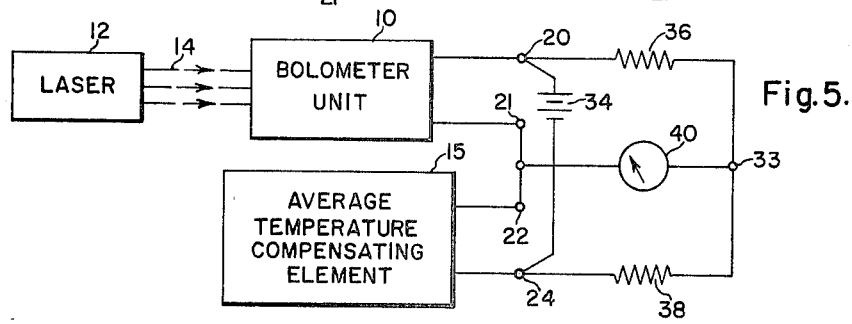
FIGURE 5 is a schematic diagram of the preferred embodiment of the subject invention.

Directing attention now to FIGURE 5, there is illustrated the manner in which the fine wire bolometer 10 previously described is utilized to perform the required measurement of the energy output from an optical source such as a laser. Illustrated therein is the combination of a bolometer 10 and an average-temperature compensating element 15 connected in a bridge circuit arrangement with a resistance 36 and a resistance 38. The compensating element 15, for example, may be a dummy bolometer unit 10′. Two identical units as shown in FIGURE 1 may be utilized or there may be the combination of a pair of bolometer units within a single enclosure such as illustrated in FIGURES 2–4. In any case, a resistance having substantially identical characteristics to the bundle of wire is used. The bolometer unit 10 and the average-temperature compensating element 15 are connected to resistances 36 and 38 such that terminal 20 of active bolometer unit 10 is connected to one side of resistance 36 while terminal 21 is connected to terminal 22 of compensating element 15. Terminal 24 is connected to one terminal of resistance 38 and the opposite ends of resistances 36 and 38 are connected together at a junction 33.

Connected across terminals 29 and 24 is a source of electrical potential shown as a D.C. battery which supplies the required electrical current for the bridge circuit formed by the resistances 36 and 38 and the bolometer unit 10 and the compensating element 15. This circuit is a Wheatstone bridge circuit and resistances 36 and 38 are commonly referred to as the ratio arms while the element 15 is known as the balancing resistance. Connected across the bridge is a galvanometer 40 which, well-known to those skilled in the art, is used for measuring current balance and unbalance of the bridge when making an electrical measurement. The galvanometer 40 is connected across the bridge circuit such that one side is connected to the common terminal between terminals 21 and 22 while the other side is connected to junction 33. Also, illustrated in FIGURE 4 is a laser device 12 emitting an optical beam 14 toward the active bolometer 10.

In order to measure the energy output from the laser device 12, the resistances 36 and 38 are chosen or are made adjustable such that a bridge balance is obtained when the active bolometer 10 and the compensating element 15 are at the same quiescent state, that is, there is no optical energy from the laser 12 being directed into the active bolometer 10. Also, it should be understood that by bridge balance, it is meant that the electrical potential difference between junction 33 and the common junction of terminals 21 and 22 is substantially zero. Having bridge balance, it is a simple matter to determine the power output of laser beam by focusing the beam 14 into the active bolometer 10 and noticing the change in resistance occurring therein by the amount of unbalance of the bridge circuit as noted by the galvanometer 40. The equation $$E = 2.38 \Delta R \text{ joules} \quad (8)$$

suggests that one measure the resistance of the active bolometer unit 10 before and after being radiated by the optical beam 14 and from the change in resistance determine the beam energy. Actually, it is much more convenient and also more accurate to simply observe the galvanometer swing following the sampling period or the pulse, whichever the case may be. By switching a known small resistance in the active bolometer branch, one can determine a factor $$N = d/\Delta R \text{ scale div. per ohm} \quad (9)$$

where $d$ is the deflection in scale diversions of the galvanometer and R is known resistance switched into active bolometer branch.

Equation 8 can then be rewritten as $$E = \left(\frac{2.38}{N}\right)^d \text{ joules} \quad (10)$$

which then provides a working equation giving beam energy in terms of galvanometer deflection. As a typical example, assume that N for the galvanometer is 1.90 mm./ohm. The equation now becomes $$E = .0126 \, d \text{ joule}$$

An energy of .01 joule corresponds to a deflection of nearly one millimeter and is, therefore, easily detectable. This corresponds to typical operation as the device is presently used, but the sensitivity may be considerably increased as will be subsequently discussed. The use procedure of the subject invention may be summarized as follows:

(1) Balance bridge so that the galvanometer 40 indicates conveniently on scale.

(2) Switch a known resistance, for example, 0.1 ohm in the active bolometer branch of the bridge and note the galvanometer deflection to determine scale divisions per ohm (N).

(3) Substitute (N) in equation $$E = \left(\frac{2.38}{N}\right) d \text{ joules}$$

Figure 6:
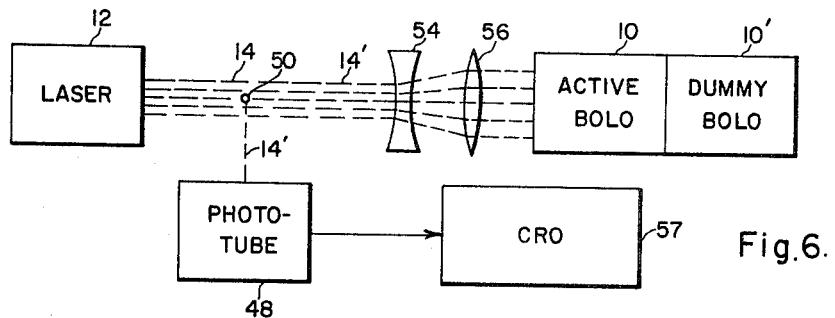
FIGURE 6 is a schematic diagram illustrative of a modification in the use of the subject invention.

In addition to measuring the power output of an optical source directly, FIGURE 6 for example, illustrates how the present invention may be used to calibrate a scattering wire phototube power/energy measuring device. The laser 12 fires a pulse directly into the active bolometer unit 10 through the divergent lens 54. A fine wire 50 is located in the path of the beam 14 emerging from the laser 12 which scatters a negligible fraction of the beam energy 14′ onto the photocathode, (not shown) of a phototube 48, the output of which is displayed and photographed as a time resolved power trace on the face of a cathode-ray oscilloscope 57. The calibration of the phototube device 48 is accomplished by comparing the area under its power vs. time trace with total pulse energy as read by the fine wire calorimeter. The integration may be performed electrically in the output circuit of the phototube device 48 so that the total pulse energy for comparison with the calorimeter is presented as a step or ramp function change in the oscilloscope trace. As has been noted, the scattering wire 50 is a sampling device. Once the phototube-scattering-wire combination has been calibrated by means of the subject invention, it may be used to measure the output beam when a utilization device replaces the bolometer assembly. The scattering wire 50 performs two useful functions, (1) it provides the phototube with a proportional sample of the main beam at a suitable low level of intensity, and (2) it leaves the main beam essentially unaltered and available for use.

The subject invention is greatly extended if it too is used with a sampling device such as a beam splitter in the form of a glass plate which reflects a known portion of the energy impinging on it while passing the remainder of the beam through it. Such an example is shown in FIGURE 6. Illustrated therein is a glass plate 52 located in the path of the optical laser beam 14 emitted from the laser device 12. The main energy passes through the plate 52 in the form of a small concentrated beam 14' while a small fraction (approx. 8%) of the beam 14' is reflected onto the active bolometer 10.

Figure 7:
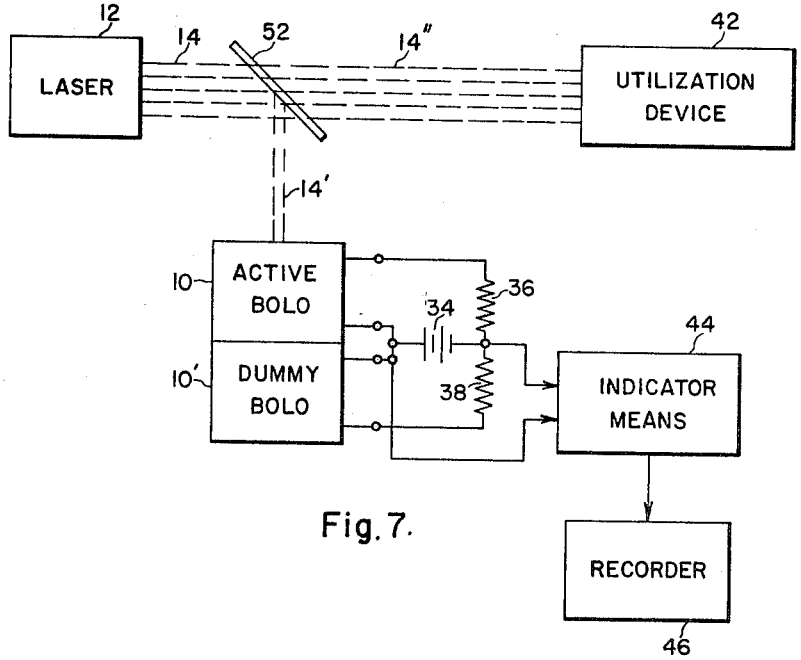
FIGURE 7 is a schematic diagram illustrating how the subject invention may be used as a calibration device.

By calibrating the flat plate 52 to determine the amount of the total energy reflected thereby, the subject invention may be used so as to measure the absolute energy of the reflected beam 14' and by knowing the percentage of the total energy reflected through the plate the output energy from the laser can easily be determined. Bolometer assembly with sampling device permanently attached is calibrated just as in the case of the scattering-wire-phototube combination. Once the fine wire calorimeter with a sampling device is calibrated, it becomes a portable instrument which can be inserted in any beam to measure the energy of that beam. Shown additionally with respect to FIGURE 7 is a means for the use of a more sensitive galvanometer means. In this illustration, the galvanometer 40 as illustrated in FIGURE 4 has been replaced by any sensitive indicator means 44 such as air-electronic voltmeter or a cathode-ray oscilloscope and a recorder means 46 such as photographic recording apparatus.

In reading the output energy of pulsed lasers, a sensitivity of .01 joules/mm. has proved adequate even when the bolometer unit is used with a sampling plate. The use of a faster indicator such as a cathode-ray oscilloscope with photographic recording has obvious advantages. It reduces the time of waiting between readings and will provide a permanent record. It might be expected that the fine wire calorimeter forming the subject invention would be used primarily as a standard for calibrating photoelectric devices. Actually, however, because it is inherently simple and relatively independent of frequency or wavelength, and has adequate sensitivity, it finds wide use in general measurements work in the optical region of the electromagnetic spectrum. What has been described, therefore, is a new and useful device for measuring the output energy of optical sources.

While there has been shown and described what are presently considered to be the preferred embodiments of the invention, modifications thereto will readily occur to those skilled in the art. It is not desired, therefore, that the invention be limited to the specific arrangements shown and described, but that numerous changes in the details of the combination or arrangement of elements may be resorted to without departing from the scope and spirit of the present invention.

I claim as my invention:

1. In a calorimetric device for measuring the output of an optical energy source the combination comprising: a container including an opening for the passage of optical energy inwardly thereof; a predetermined length of electrically insulated wire having a selected value of resistance randomly packed to form a loose, bundled mass of wire within said container for absorbing said energy; and means for making electrical connection to each end of said wire.

2. In a calorimeter for measuring the output of an optical source, the combination comprising: an insulated container having a mirrored inner surface and including a window to allow said optical energy to pass inwardly of said container; a predetermined length of electrically insulated electrical wire having a predetermined value of resistance and being loosely packed randomly to form a mass of wire within said container for absorbing said optical energy; and an electrical resistance measuring means connected to said wire for measuring the change of resistance of said wire.

3. Apparatus for measuring the optical energy output of a laser comprising in combination: a bolometer unit comprising a container having a window and a predetermined length of electrically insulated electrical wire having a predetermined resistance packed in said container in a random manner to form a loose, bundled mass of wire; an ambient temperature compensating element having electrical properties similar to said electrical wire disposed in said container; means for directing said optical energy to said bolometer unit while said compensating element acts to offset variations in ambient temperature.

4. A calorimeter for measuring the power output of an optical energy source providing a highly collimated beam of coherent light energy in the near visible or in the visible region of the light spectrum comprising in combination: a thermally insulated housing; a first and a second bolometer unit enclosed in said housing, said first and said second bolometer unit each comprising a container having a reflective inner surface and an opening opposite said reflective inner surface and a predetermined length of randomly packed and bundled electrically insulated wire having a predetermined value of resistance; means for directing a predetermined amount of energy from said beam of coherent light through said opening of said first bolometer unit wherein substantially all of said predetermined amount of energy is absorbed causing a change in resistance of said wire in said first bolometer unit due to temperature rise as light energy is connected to heat energy; a first and a second resistance connected to form ratio arms of a Wheatstone bridge in combination with said first and second bolometer units, said first bolometer unit acting as the resistance to be measured and said second bolometer acting as dummy unit and forming the fourth arm of said bridge whereby said dummy unit serves to compensate for any slow ambient temperature changes.

5. In a bolometer for measuring the output of an optical source, the combination comprising; an insulated container having a mirrored inner surface and including a window to allow said optical energy to pass inwardly to said container; a randomly packed predetermined length of electrically insulated wire loosely bundled inside said container to successively scatter and absorb optical energy within said container; and means for making electrical connection to each end of said wire.

6. In a calorimetric device for measuring the output of an optical energy source, the combination comprising; a container including an opening for the passage of optical energy inwardly thereof; a randomly packed loosely bundled predetermined length of electrically insulated wire for successively scattering and absorbing said energy within said container; said wire having a substantially clear electrical insulating coating, the absorption of energy by said wire being determined primarily by the surface of the wire; and means for measuring the change of resistance of said wire in response to said absorption.

7. In a calorimeter for measuring the energy of an electromagnetic beam in the visible and near visible range comprising, in combination; a container having an opening for the passage of light energy therein; an electrically insulated wire of predetermined length and electrical resistance randomly disposed to form a bundle of tangled wire within said container; any portion of said wire absorbing a fraction of the incident beam energy and scattering the remainder to be absorbed by other portions; and means connected to said wire for measuring the change of resistance thereof upon being radiated by said energy.

8. In a calorimeter for measuring the energy of an electromagnetic beam in the visible and near visible range, the combination comprising; a container having a transparent window for allowing entrance of said electromagnetic beam into said container; a randomly packed loosely bundled predetermined length of electrically insulated wire located inside said container; and dispersing means positioned in the path of said beam for distributing the incident energy throughout a larger volume in the wire mass whereby the density of beam energy which the calorimeter can accept without burnout is increased.

9. In a bolometer for measuring the energy of an electromagnetic beam in the visible and near visible range, the combination comprising a length of electrically insulated wire loosely bundled to form a tangled mass; any part of said wire absorbing a fraction of said energy directed thereto and scattering the remainder to be absorbed by other parts of said wire; and means for summing over the entire length of said wire the resistance change of each part of said wire in response to the energy absorbed.

References Cited by the Examiner

UNITED STATES PATENTS

| | | | |
|---|---|---|---|
| 2,411,120 | 11/1946 | Von Hortenau | 338—25 |
| 2,423,461 | 7/1947 | Meahl | 338—81 |
| 2,442,823 | 6/1948 | Polye | 73—355 |
| 2,624,012 | 12/1952 | English et al. | 73—193 |
| 2,909,908 | 10/1959 | Pastuhov et al. | |
| 3,023,398 | 2/1962 | Siegert | 250—83.3 |

OTHER REFERENCES

Measurements of the Laser Output; Proceedings of the IRE, February 1962, p. 207.

Photoelectric Energy Meter for Measuring Laser Output; Proceedings of the IEEE, February 1963, vol. 51, No. 2, pp. 365, 366.

RICHARD C. QUEISSER, *Primary Examiner.*

E. KARLSEN, J. P. BEAUCHAMP, *Assistant Examiners.*